(12) United States Patent
Shore et al.

(10) Patent No.: US 6,724,429 B2
(45) Date of Patent: Apr. 20, 2004

(54) SYSTEM FOR SENSING AND DISPLAYING LENS DATA FOR HIGH PERFORMANCE FILM AND VIDEO CAMERAS AND LENSES

(75) Inventors: Morris Shore, Sudbury, MA (US); Wynn Bowers, Shrewsbury, MA (US); Vince H. Catlin, Winnetka, CA (US); Felipe Navarro, Granada Hills, CA (US); Christopher J. Verplaetse, Somerville, MA (US)

(73) Assignee: Panavision, Inc., Woodland Hills, CA (US)

( * ) Notice: Subject to any disclaimer, the term of this patent is extended or adjusted under 35 U.S.C. 154(b) by 0 days.

(21) Appl. No.: 10/128,539

(22) Filed: Apr. 22, 2002

(65) Prior Publication Data

US 2003/0011692 A1 Jan. 16, 2003

Related U.S. Application Data

(60) Provisional application No. 60/285,878, filed on Apr. 23, 2001.

(51) Int. Cl.[7] ............................................... H04H 5/225
(52) U.S. Cl. .................................... 348/373; 348/375
(58) Field of Search ............................... 348/375, 373, 348/333.02, 345, 357, 207.99; 396/72, 87, 103, 131, 137, 284, 281, 357; 359/705

(56) References Cited

U.S. PATENT DOCUMENTS

| | | | |
|---|---|---|---|
| 4,002,405 A | 1/1977 | Stahl | |
| 4,145,732 A | 3/1979 | Pandres, Jr. | |
| 4,404,595 A | * 9/1983 | Ushiro et al. | 348/357 |
| 5,012,335 A | 4/1991 | Cohodar | |
| 5,014,080 A | 5/1991 | Miyadera | |
| 5,073,790 A | 12/1991 | Ogawa | |
| 5,146,071 A | 9/1992 | Ookubo et al. | |
| 5,220,848 A | 6/1993 | Basilico | |
| 5,223,867 A | 6/1993 | Nguyen-Nhu | |
| 5,274,409 A | * 12/1993 | Tokumaru et al. | 396/79 |
| 5,371,633 A | 12/1994 | Kawamura et al. | |
| 5,517,300 A | 5/1996 | Parker et al. | |
| 5,521,671 A | * 5/1996 | Aoki et al. | 396/281 |
| 5,546,126 A | * 8/1996 | Yajima et al. | 348/207.99 |
| 5,561,686 A | 10/1996 | Kobayashi et al. | |
| 5,570,177 A | 10/1996 | Parker et al. | |
| 5,594,517 A | * 1/1997 | Tsunefuji | 396/87 |
| 5,666,159 A | 9/1997 | Parulski et al. | |
| 5,719,622 A | 2/1998 | Conway | |
| 5,983,032 A | 11/1999 | Miyamoto | |
| 6,148,151 A | 11/2000 | Bauer | |
| 6,161,933 A | 12/2000 | Tschida et al. | |
| 2003/0011692 A1 | * 1/2003 | Shore et al. | 348/345 |

FOREIGN PATENT DOCUMENTS

| | | |
|---|---|---|
| DE | 42 20 129 A1 | 12/1993 |
| EP | 0 574 105 A1 | 6/1993 |
| JP | 4-42673 | 2/1992 |
| JP | 05-333256 | * 12/1993 |

* cited by examiner

*Primary Examiner*—Aung Moe
(74) *Attorney, Agent, or Firm*—Morrison & Foerster LLP

(57) ABSTRACT

A system for sensing and displaying lens data for a cinematography zoom lens and camera in real time. A plurality of sensors are connected to the lens for producing signals continually representing the present positions of focus, zoom and T-stop setting rings of the lens. A range finder is positioned adjacent the lens for producing a signal representing the distance from the lens to an object located in front of the lens. A printed circuit board with a microprocessor receives and processes the signals and has a memory with data representing the focus, zoom and T-stop characteristics of that lens. A display device is positioned adjacent the lens and selectively displays indicia representing the positions of the focus, zoom and T-stop settings, the distance to the object and the depth of field.

48 Claims, 12 Drawing Sheets

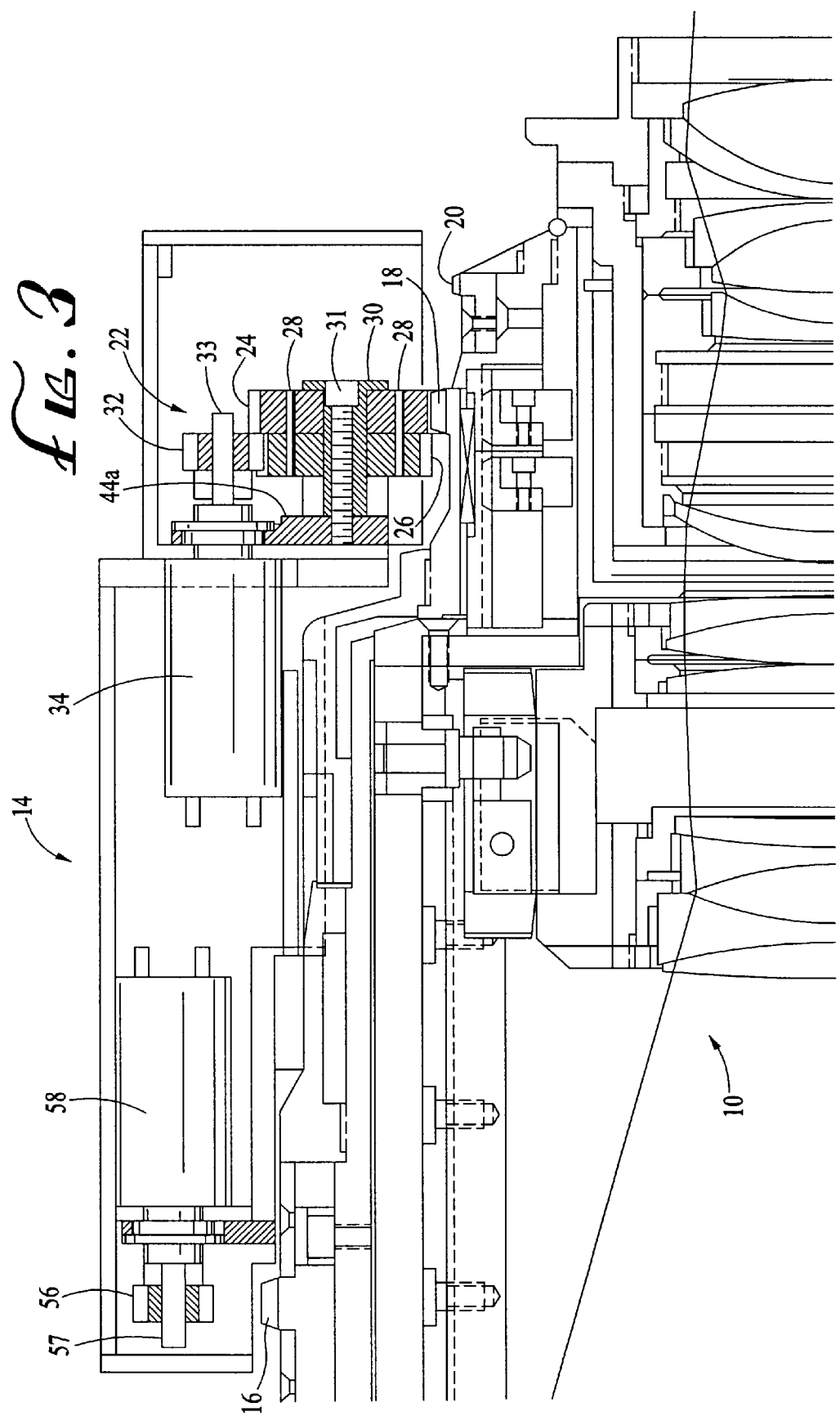

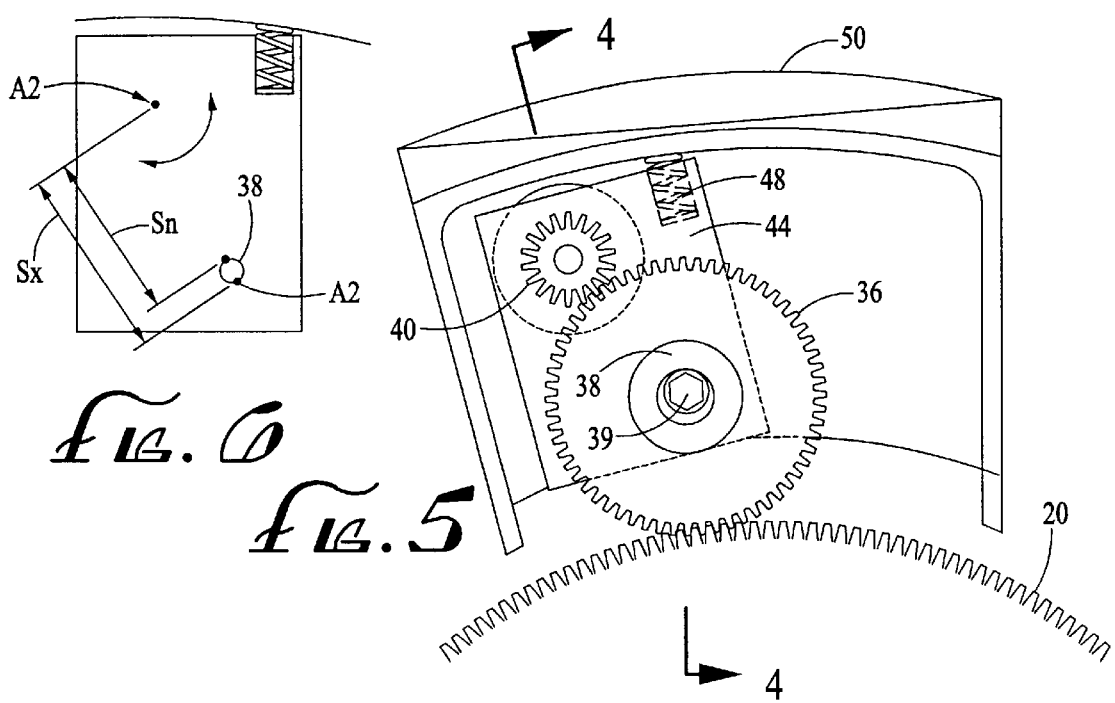
FIG. 6
FIG. 5
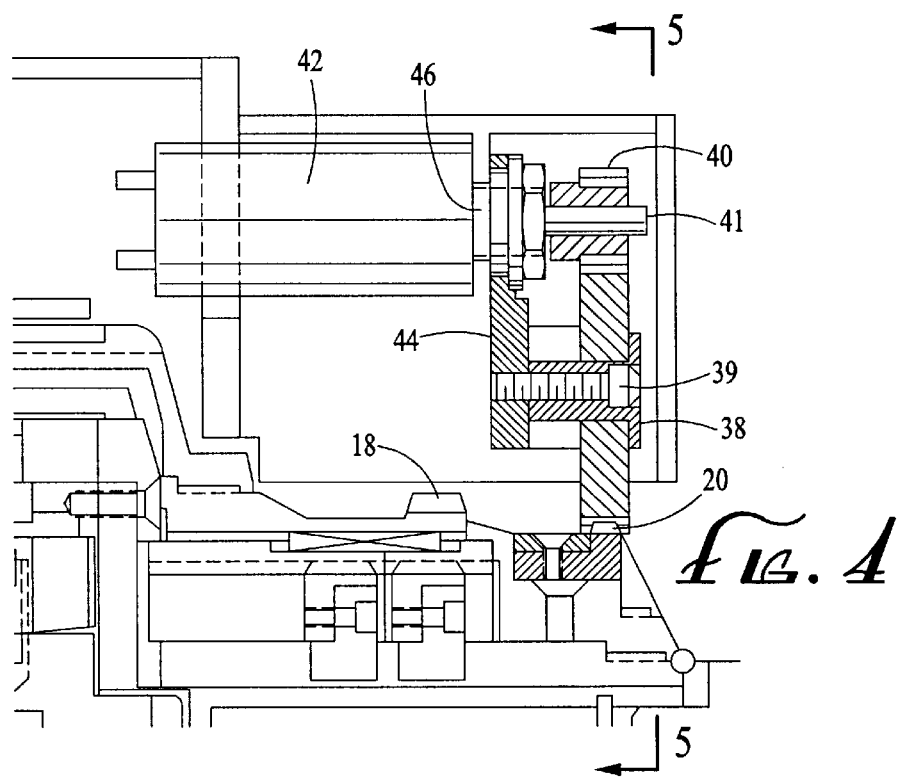
FIG. 4

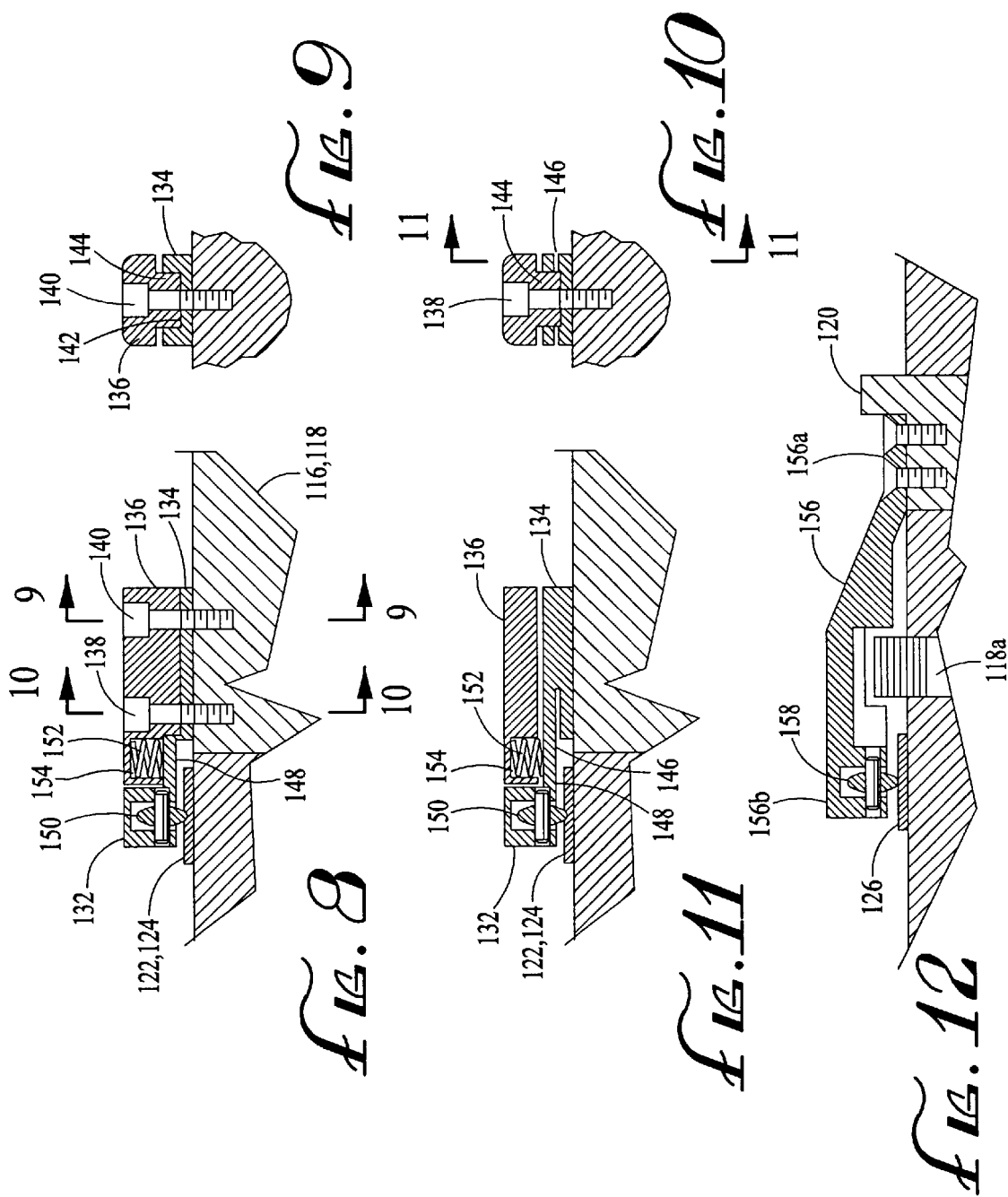

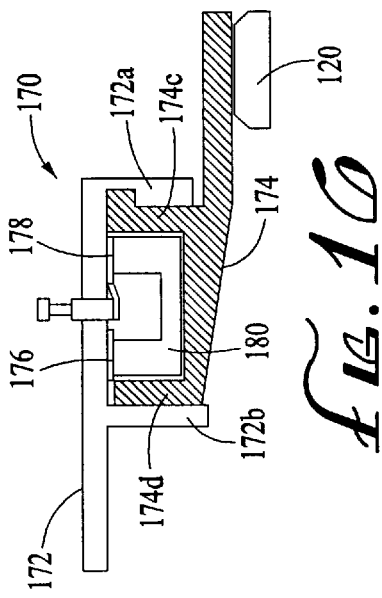
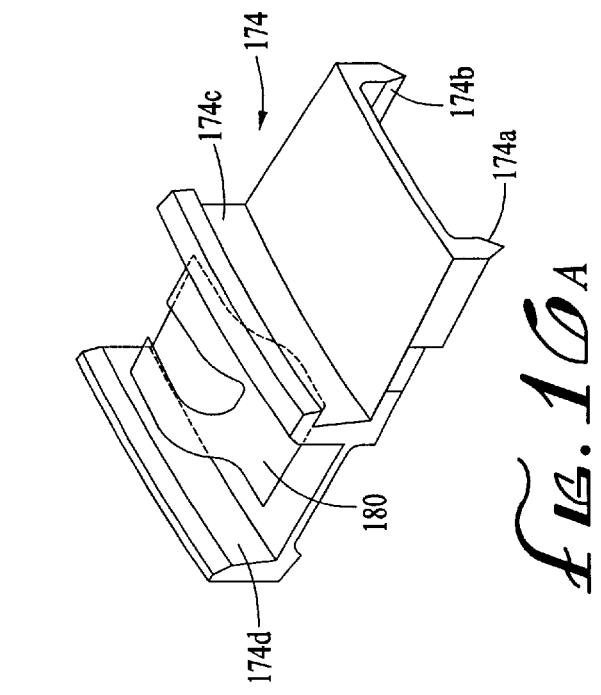
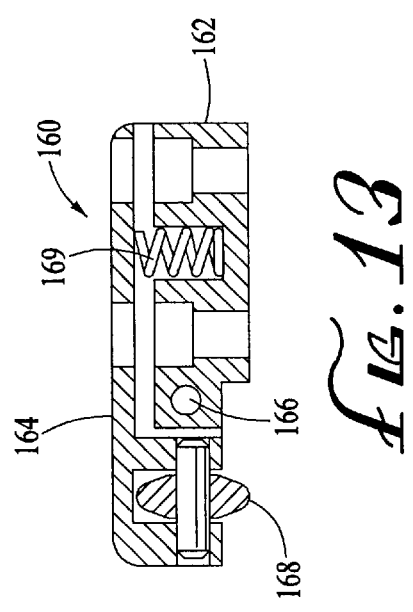
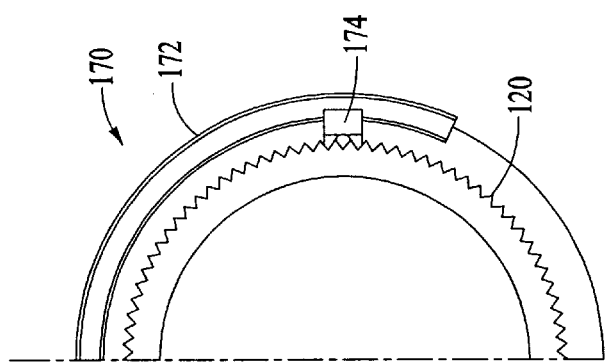
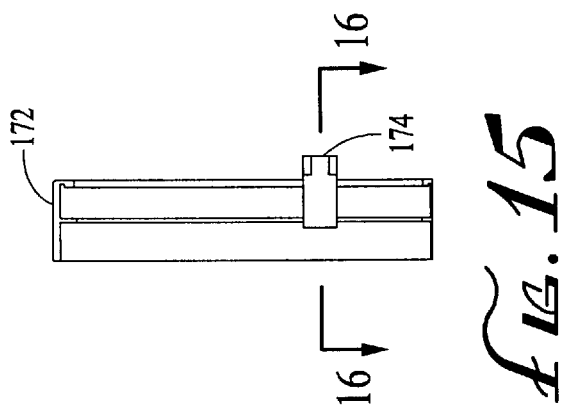

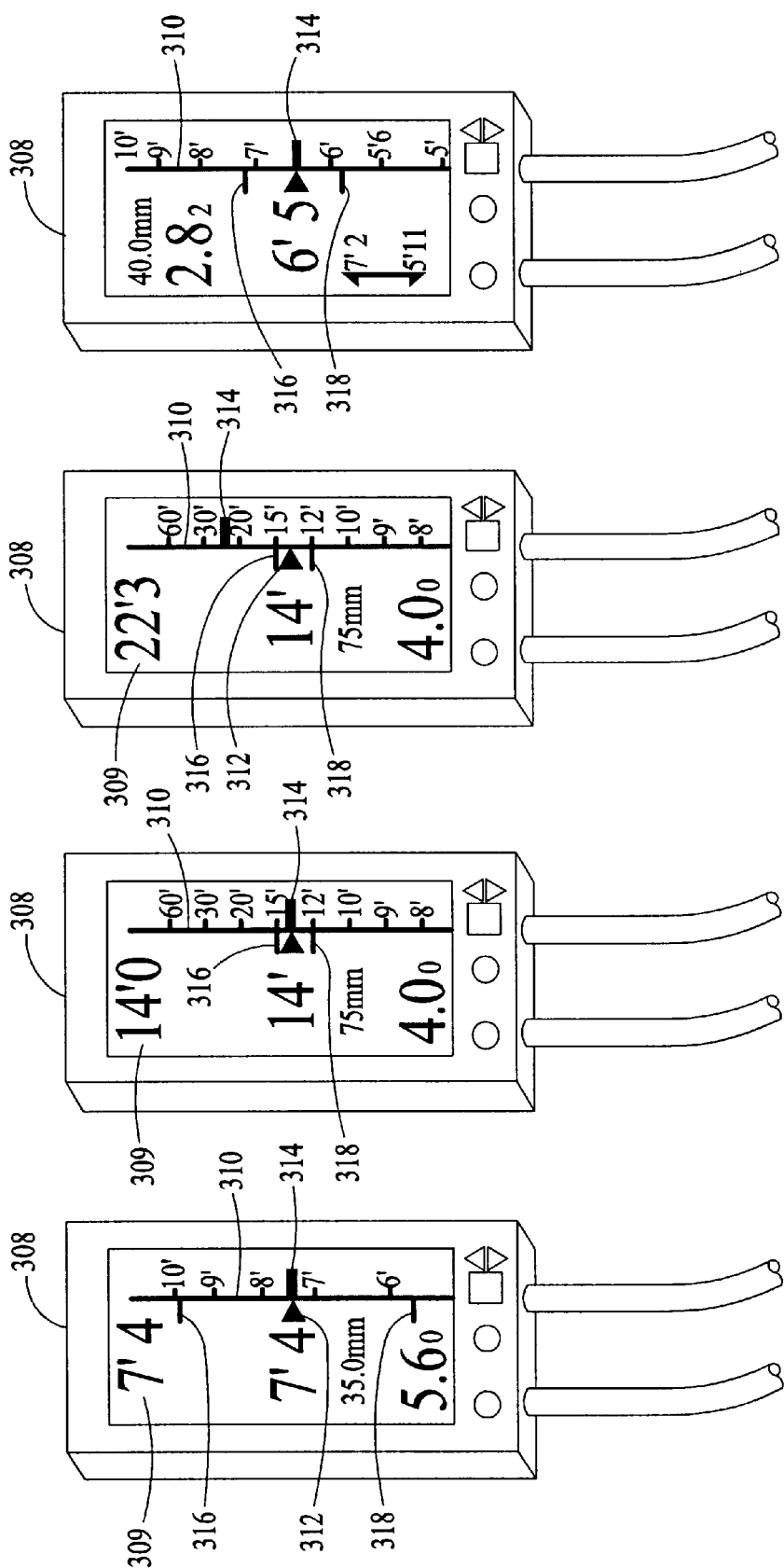

US 6,724,429 B2

SYSTEM FOR SENSING AND DISPLAYING LENS DATA FOR HIGH PERFORMANCE FILM AND VIDEO CAMERAS AND LENSES

CROSS-REFERENCE TO RELATED APPLICATION

The present application is a Non-Provisional application of Provisional U.S. Patent application Serial No. 60/285,878, filed Apr. 23, 2001 entitled "High Performance Film and Video Lens Data Sensing and Display System".

FIELD OF THE INVENTION

This invention relates to a system for sensing and displaying data in real time for high performance lenses used on film and video cameras for high quality motion pictures and the like and, in particular, for sensing and displaying relevant data such as the distance to the object being filmed, the focus distance of the lens, the T-Stop of the lens, the current depth of field of the lens and the focal length of a zoom lens.

BACKGROUND OF THE INVENTION

In cinematography it is valuable to have certain data instantly available concerning the settings of the lens that is being used and the distance to the object being photographed, particularly when the object is moving relative to the camera, thereby requiring focus distance adjustments, and when other lens adjustments are required, such as the focal length of a zoom lens and/or the T-Stop. While such lens data is available to the cameraman (or focus puller) by looking at the lens and reading the three settings (focus distance, focal length and T-Stop) at three separate locations along the lengths of the lens, this distracts the cameraman from visually following the scene being photographed, which often includes moving objects that must be tracked. Further, when the focal length, focus distance and/or the T-Stop of the lens is changed for any reason, the depth of field of that lens also changes, as is well known in the art, but previously such data has not been instantly and automatically available and visible to the cameraman. Still further, while sensors and display devices have been used that indicate the distance from the camera to the object being photographed, heretofore that distance data has not been coordinated with the relevant lens data in real time.

BRIEF SUMMARY OF THE INVENTION

Thus, it is an object of the present invention to provide an apparatus and system for sensing one or more of (a) distance to the object being filmed, (b) focus distance of the camera lens, (c) focal length of the camera lens, (d) T-Stop of the lens and (e) other similar lens data and displaying that data in real time for convenient reference by the cameraman and others. A further object of this invention is to provide a system for using such data to determine and display the depth of field instantaneously. Another object of this invention is to provide a graphic representation of the depth of field and, in particular, in direct relationship to the current focus distance and/or distance to the object being photographed. Still another object of this invention is to provide sensor arrangements for the system that are applicable to existing lenses. A still further object is to provide a sensing and display system that includes a microprocessor and memory for data specific to that lens for producing precise signals to a display unit. Other and more detailed objects of this invention will appear to those skilled in the art from the following description of the presently preferred embodiments of the invention and the accompanying drawings.

BRIEF DESCRIPTION OF THE DRAWINGS

FIGS. 1–6 illustrate a first preferred embodiment of the lens data sensing apparatus installed on a conventional cine zoom lens with FIG. 1 being a diagrammatic sectional elevation view of the lens and sensing apparatus; FIG. 2 being a sectional elevation taken on the line 2—2 of FIG. 1, FIG. 3 being an enlarged sectional view taken substantially on the line 3—3 in FIG. 2, FIG. 4 being an enlarged sectional view taken substantially on the line 4—4 in FIG. 2, FIG. 5 being a sectional view taken substantially on the line 5—5 in FIG. 4, and FIG. 6 being a diagrammatic illustration of the pivotal and spring loaded mounting arrangement of the gear type sensing mechanism;

FIGS. 7–16A illustrate a second preferred embodiment of the lens data sensing system of the present invention with FIG. 7 being a plan view of a typical zoom lens having the sensor arrangement of this embodiment installed on the exterior thereof, FIG. 8 being a sectional view of one of the wipers taken on the line 8—8 of FIG. 7, FIG. 9 being a sectional view of the wiper taken on the line 9—9 in FIG. 8, FIG. 10 being a sectional view taken on the line 10—10 in FIG. 8, FIG. 11 being a sectional view similar to FIG. 8 but taken on the line 11—11 in FIG. 9 that is offset from the center of the wiper, FIG. 12 being a sectional view of another form of wiper taken on the line 12 in FIG. 7, FIG. 13 being a sectional view similar to FIGS. 8 and 12 and illustrating still another form of wiper, FIG. 14 being an end view of another form of sensor, FIG. 15 being a side elevation view of the wiper and curved housing portion of the sensor shown in FIG. 14, FIG. 16 being a sectional view taken on the line 16—16 in FIG. 15, and FIG. 16A being a perspective view of the wiper shown in FIGS. 14–16;

FIGS. 20–24 are elevation views of the display device of this invention for displaying the lens data sensed by any of the three embodiments of the sensing devices shown in FIGS. 1–18 with FIG. 20 being a view illustrating the lens, the range finder and the display device in close proximity in a preferred use of the system, and FIGS. 21–24 illustrating some typical displays of indicia on the display device.

DETAILED DESCRIPTION OF THE PREFERRED EMBODIMENTS

Figure 1:
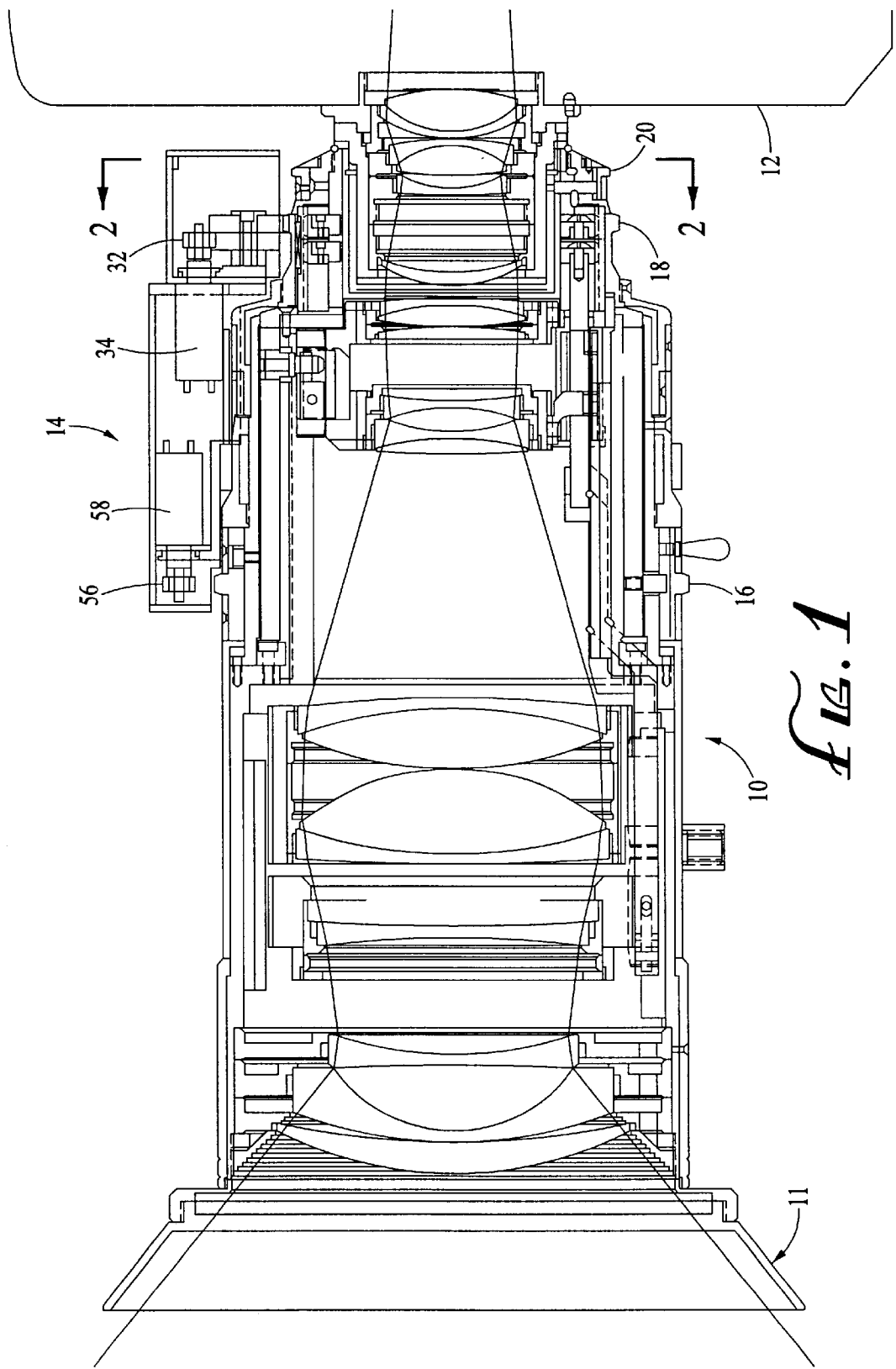

Referring now to FIGS. 1–6, a typical high performance zoom lens 10 is mounted on a camera 12 which may be a high performance motion picture camera or HD video camera that advantageously uses the precision data sensing and display of this invention. The first preferred embodiment of the inventive data sensing apparatus 14 is mounted on the lens 10, which may be a conventional zoom lens without internal modifications to use the invention. The lens 10 has a toothed ring 16 for adjusting the focal length of the zoom lens, a toothed ring 18 for adjusting the focus of lens 10 and a toothed ring 20 for adjusting the T-Stop of lens 10 in a conventional manner.

Figure 2:
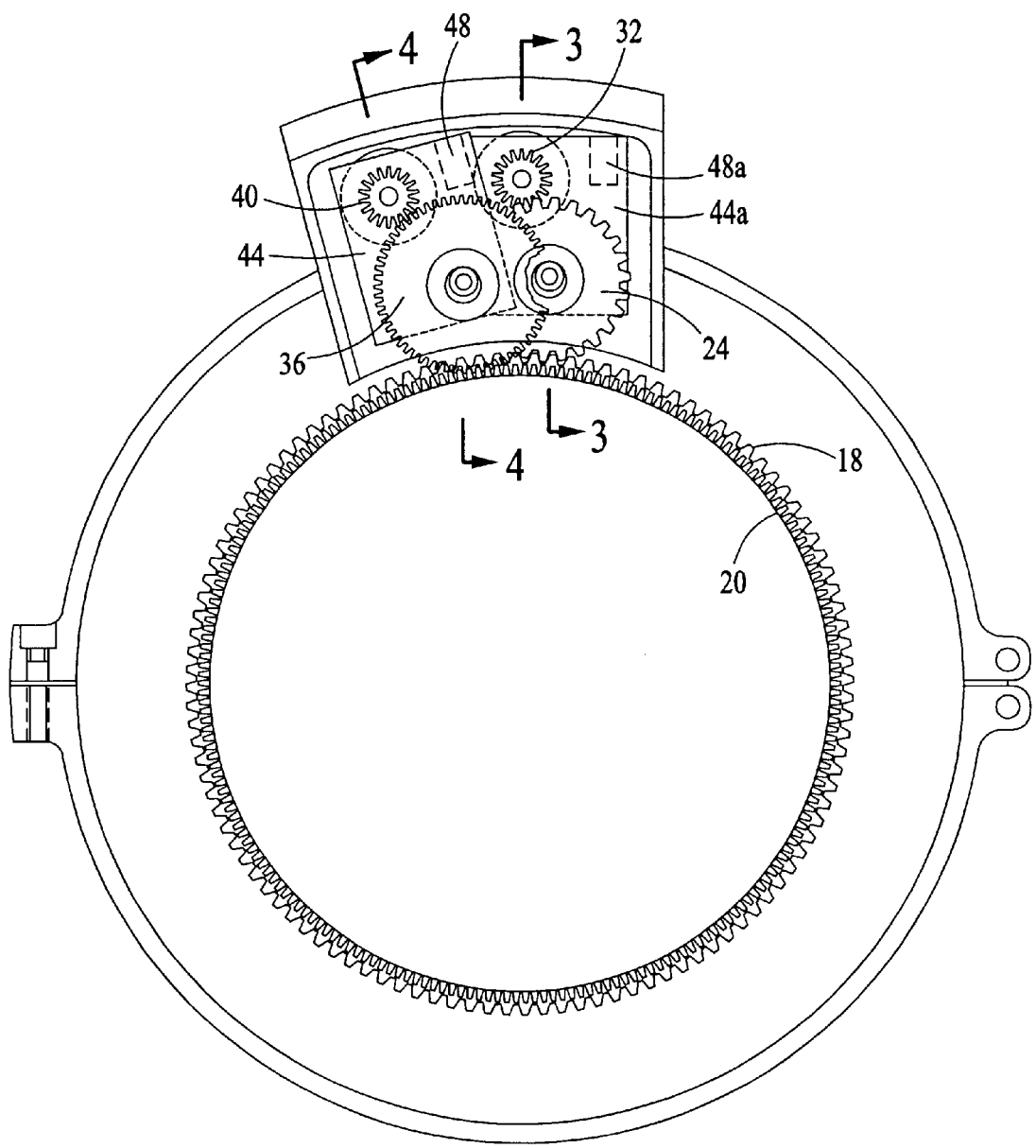
Figure 7:
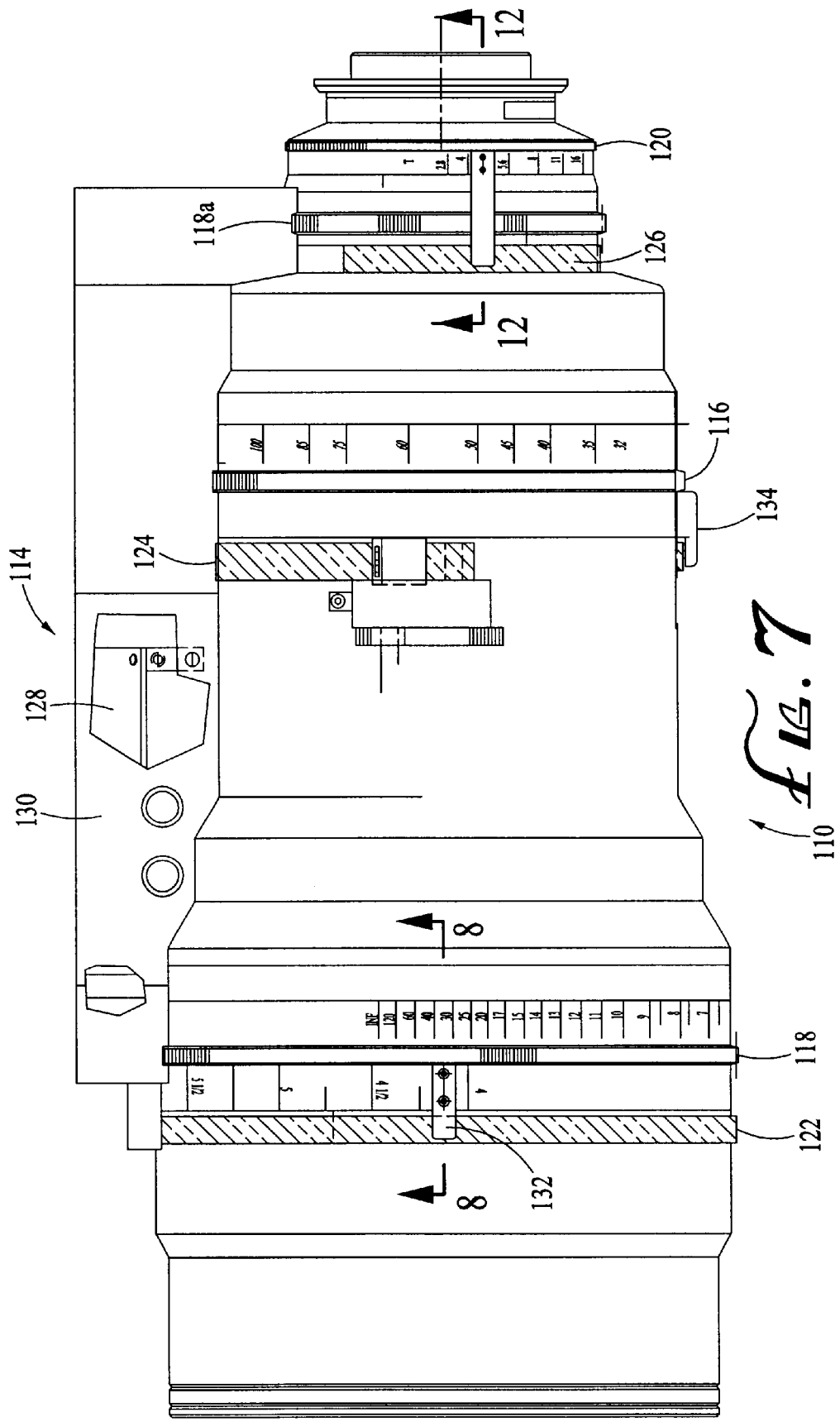

Referring more particularly to FIGS. 2 and 3, the lens focus setting detection portion of the lens data sensing apparatus 14 will be described first and includes a focus sensing assembly 22 having a spur gear 24 engaging the toothed ring 18 that is used for lens focus adjustment. Gear 24 is connected to an adjacent spur gear 26 by pins 28 and the gears 24 and 26 are rotatably mounted on an eccentric shaft 30. A spur gear 32 engages gear 26 and is mounted on the shaft 33 of a rotary potentiometer 34 for sensing the position of the focus ring 18 through the gears 24, 26 and 32. In other words, as the focus ring 18 is rotated, either manually or by a drive motor (not shown), to change the distance at which the lens 10 is focused, the spur gears 24, 26 and 32 are rotated to in turn rotate the shaft 33 of potentiometer 34 to thereby produce a signal responsive to an applied voltage that indicates the actual position of focus ring 18 at all times. The potentiometer may be of any convenient type for developing a signal that represents the position of focus ring 18, such as a ten-turn potentiometer, Model No. 162 manufactured by Spectrol Electronics Corp., Ontario, Calif. The eccentric shaft 30 is adjustable by loosening the mounting bolt 31 and rotating the shaft 30 for adjusting the distance meshing relationship between spur gear 26 and spur gear 32 to minimize the backlash therebetween. The backlash adjustment between the toothed ring 18 and spur gear 24 will be described below.

Referring more particularly to FIGS. 4–6, a spur gear 36 engages the toothed ring 20 that is used to adjust the T-Stop of the lens 10. The gear 36 is rotatably mounted on an eccentric shaft 38. Spur gear 36 engages a spur gear 40 mounted on the shaft 41 of a rotary potentiometer 42 for sensing the position of the T-Stop ring 20, the same as or similar to the manner in which the aforedescribed potentiometer 34 senses the position of the focus ring 18. The eccentric shaft 38 is adjustable by loosening the bolt 39 and rotating the shaft 38 to adjust the distance and meshing between spur gears 36 and 40 to minimize the backlash therebetween when the direction of rotation is changed. The eccentric shaft 38 is supported on a plate 44 that is rotatably supported on a bushing 46 that in turn is mounted concentrically of the shaft 41 of the potentiometer 42. A compression spring 48 is mounted in the plate 44 and engages the housing 50 for resiliently urging the plate 44 in a clockwise direction (as shown in FIG. 5) to in turn urge the gear 36 into tight engagement with the toothed ring 20 for minimizing the backlash therebetween. Thus, as shown diagrammatically in FIG. 6, the spacing between the axis of rotation A1 of the gear 36 and the axis of rotation A2 of the potentiometer 42 carrying the gear 40 is adjustable by the eccentric shaft 38 between a maximum dimension Sx and a minimum dimension Sn, while the distance between the toothed ring 20 and gear 36 is infinitely and resiliently adjusted by the pivotal mounting of plate 44 and the spring 48.

With respect to the aforedescribed focus sensing apparatus 22, a similar pivotally mounted plate 44a supports the eccentric shaft 30 and gears 24 and 26 that rotate with the focus ring 18 and plate 44 is resiliently urged in a clockwise direction by a spring 48. Similarly, although not shown in detail, the toothed ring 16 for adjusting the focal length of zoom lens 10 is engaged by an idler gear (not shown) rotatably mounted on an eccentric shaft (not shown) supported on a pivot plate (not shown) and engages a spur gear 56 mounted on the shaft 57 of a potentiometer 58 for sensing the position of the ring 16 to thereby indicate the focal length of the lens 10 at all times. Again, the pivot plate may be resiliently urged by a compression spring to maximize the meshing engagement between the gear and the zoom ring 16, and an eccentric shaft may be provided to adjust the meshing between gears 52 and 56, all to avoid inaccuracies in sensing due to backlash.

Thus, by the lens data sensing apparatus 14 illustrated in FIGS. 1–6 and described above, the exact positions of the toothed rings 16, 18 and 20 are sensed by the potentiometers 58, 34, and 42, respectively, to thereby produce signals representing the position of each ring and, in turn, the focal length, focus distance and T-Stop, respectively, of the lens 10, which signals will be used for displaying that information as described below with respect to FIGS. 20–24.

Referring now to FIGS. 7–16, a second embodiment of a lens data sensing apparatus 114 is shown on another typical zoom lens 110 and this second embodiment also may be installed on the exterior of an existing zoom lens. In this embodiment, the toothed rings 116, 118 and 120 for adjusting the focal length, focus distance and T-Stop, respectively, of the lens 110 are arranged in a different order along the lens 110 than lens 10. Also, the rings 116, 118 and 120 are not engaged by gears, as with the first embodiment, but rather a different sensing arrangement is used. Specifically, for sensing the focal length (zoom) setting of the lens 110 at all times, a length of a pressure sensitive, infinitely variable linear potentiometer 122 is mounted on a stationary portion of the lens 110 adjacent the zoom ring 116 and extends circumferentially around a substantial portion of the circumference of the lens. Similarly, a linear potentiometer 124 is mounted on a stationary portion of the lens 110 adjacent the focus adjustment ring 118 and extends circumferentially around a substantial portion of the lens. Lastly, another linear potentiometer 126 is mounted on a stationary portion nearest the T-Stop ring 120 and extends circumferentially around a substantial portion of the lens. The pressure sensitive linear potentiometers 122, 124 and 126 may be of any convenient type, such as the type that uses the membrane switch concept and is capable of producing a signal representing the point at which an external pressure is being applied to the linear potentiometer (available under the trademark "Soft Pot"from Spectra Symbol, Inc. of Salt Lake City, Utah). The linear potentiometers 122, 124 and 126 are sealed whereby no electrical current or voltage is conducted to the lens housing or to anyone or anything that contacts the exterior surface of the potentiometers. The electrical connections (not shown) of the potentiometers are provided on one end and are connected to a printed circuit board 128 located in housing 130 mounted on one side (away from the cameraman) of the lens 110.

For actuating the linear potentiometers 122, 124 and 126, a wiper is provided with each ring 116, 118 and 120 and rotates with that ring while applying pressure to the exterior of the adjacent corresponding linear potentiometer. Specifically, a wiper 132 is mounted on the zoom ring 116 to extend over the top of the linear potentiometer 122, and the same or a similar wiper 134 is mounted on the focus ring 118 to extend over the linear potentiometer 124. Referring specifically to FIGS. 8–11, the wiper 132, 134 has a finger member 134 and mounting member 136 which are mounted on the toothed ring (either zoom ring 116 or focus ring 118) by two screws 138 and 140. The finger member 134 has an upwardly facing keyway 142 in the center at the location of screws 138 and 140 for receiving a downwardly facing key 144 on the mounting member 136. The lateral sides of finger member 134 adjacent the forward (left in FIG. 8) portion include a horizontal slot 146 (see FIGS. 10 and 11) that creates a cantilevered finger 148 extending forwardly over the linear potentiometer 122. A roller 150 is rotatably mounted in a cavity on the end of finger 148 and engages the linear potentiometer 122. The roller 150 preferably has a rounded outer periphery as shown to minimize the wear on the potentiometer 122 caused by rolling therealong. A compression spring 152 is positioned in a downwardly facing cavity 154 in the mounting member 136 and engages the cantilevered finger 148 to urge the finger downwardly and thereby resiliently urge the roller 150 against the linear potentiometer 122, 124 for indicating the location (setting) of the ring 116, 118.

A modified form of wiper 156 (see FIG. 12) is provided for actuating the T-Stop linear potentiometer 126 because of the lack of space adjacent either side of the T-Stop ring 120. Wiper 156 is a one-piece device having one end 156a mounted by a pair of screws on a portion of and adjacent to ring 120 so that it rotates with the ring 120. The wiper 156 is cantilevered over the toothed portion of a ring 118a that is also usable for adjusting the lens focus through internal components. The wiper 156 has a second end 156b positioned over the T-Stop linear potentiometer 126. A roller 158 is rotatably mounted in a cavity on the end 156b and engages the linear potentiometer 126. The dimensions and angular position of the mounting surface at the end 156a of the wiper 156 are selected to cause the roller 158 to resiliently engage and activate the linear potentiometer 126, thereby providing an indication of the position (setting) of the T-Stop ring 120.

Still another modified form of wiper 160 is shown in FIG. 13 that may be substituted directly for wiper 132 where the space adjacent the ring is adequate. Wiper 160 has a mounting member 162 mounted by a pair of screws to an extended portion of the ring, such as focal length ring 116 or focus ring 118, that rotates with the ring for adjusting the settings. A finger member 164 is positioned over the mounting member 162 and pivotally connect thereby by a pin 166. Again, a roller 168 is mounted in a cavity on the end of finger member 164 for engaging the linear potentiometer (not shown in FIG. 13). A compression spring 169 is mounted in a cavity in mounting member 164 and engages the finger member 164 to resiliently urge the finger member to pivot about the pin 166 and cause the roller 168 to engage and apply activating pressure to the linear potentiometer.

Referring now to FIGS. 14, 15, 16 and 16A, another form of potentiometer device 170 is shown for use on a lens that does not even have adequate space for the above-described devices that use the linear potentiometer tape. The device 170 includes a housing 172 and a wiper 174 superimposed over an adjusting ring, such as T-Stop ring 120, with the housing mounted on a stationary portion of the lens and the wiper 174 mounted directly on the outer periphery of the ring 120. The wiper 174 may be provided with teeth 174a and 174b for engaging the teeth on ring 120. Also, the wiper 174 is provided with a pair of outwardly extending rails 174c and 174d for slidably engaging a pair of inwardly extending rails 172a and 172b on the housing 172. Between the rails 172a and 172b, a pair of spaced, conductive strips 176 and 178 are provided and electrically connected to the printed circuit board (described below). A conductive clip 180 is mounted between the rails 174c and 174d of wiper 174 and electrically connects the conductive strips 176 and 178 to form a potentiometer that indicates the position of wiper 174 (and therefore the setting of ring 120). Thus, a lens data sensing apparatus is formed by this potentiometer device 170 of this modified embodiment that provides the same lens data information as the previously described linear potentiometer devices for use with the display apparatus of FIGS. 20–24 described below.

Figure 17:
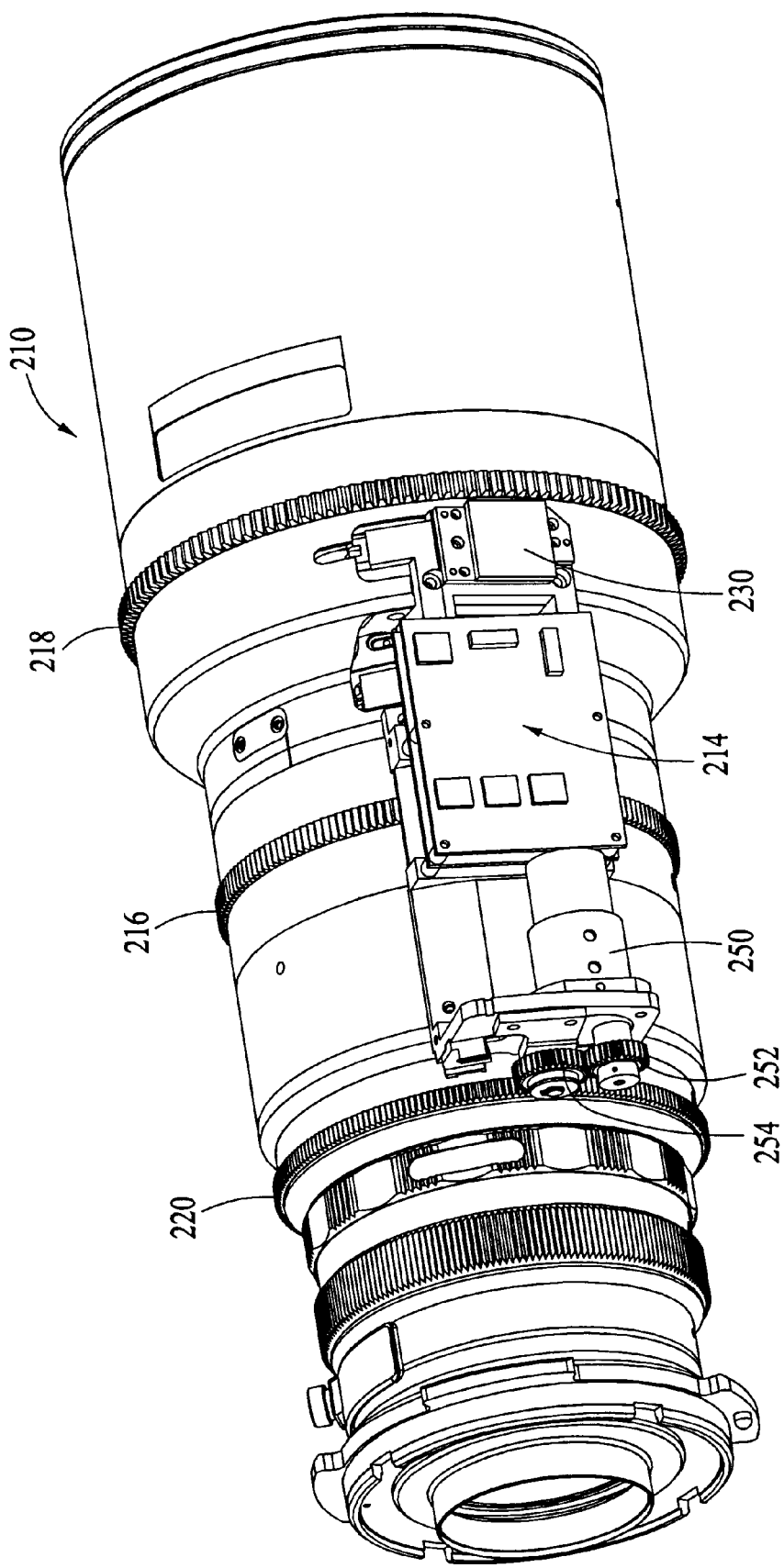
FIGS. 17 and 18 illustrate a third preferred embodiment of the lens data sensing system of the present invention with FIG. 17 being a perspective view of the lens with the data sensing apparatus and FIG. 18 being a perspective view of the data sensing devices and the three internal sensor rings for the focus, focal length and T-Stop settings separate from the other lens components.
Figure 18:
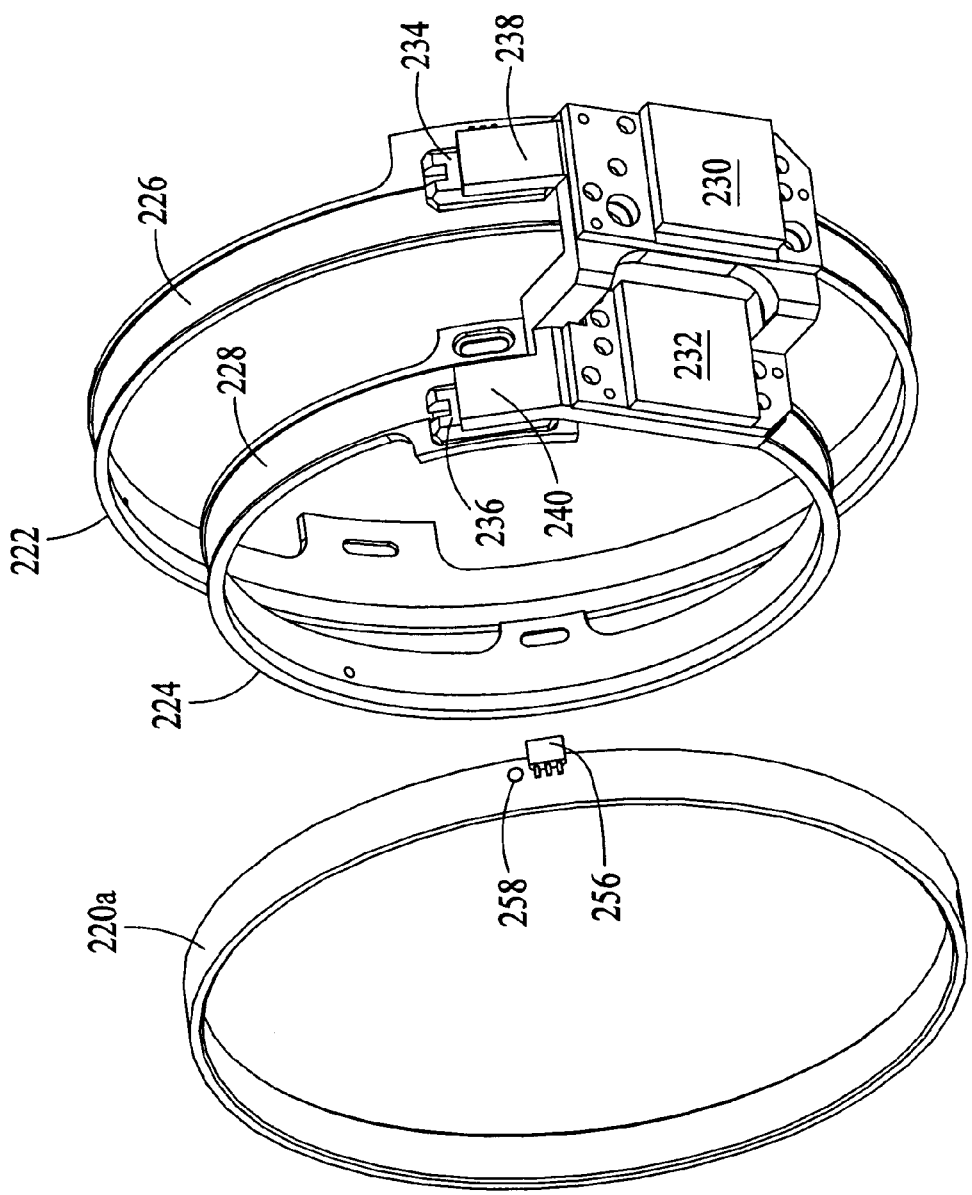

Referring now to FIGS. 17 and 18, a third embodiment of a lens data sensing apparatus 214 for use on a typical zoom lens 210 is illustrated. Again, as in the second zoom lens 110, the order of the adjusting rings along the lens is different than on the first lens 10. This third embodiment is well suited for inclusion in the original construction of a lens whereas the two previous embodiments are readily adapted to existing zoom lens. The zoom lens 210 again has toothed rings 216, 218, and 220 for adjusting the focal length, focus distance and T-Stop, respectively, of the lens. The positions of each of those rings are sensed by this apparatus 214. As with the second embodiment, the positions of the toothed rings 216 and 218 are sensed in a slightly different manner than the position of the T-Stop toothed ring 220. Specifically, on the internal portions of each of the toothed rings 218 and 216 there is provided a stainless steel ring 222 and 224, respectively, that rotates with the toothed ring as setting adjustments are made. A conventional optical pattern band 226 and 228 is wrapped around each of the stainless steel rings 222 and 224 and is readable by an optical encoder 230 and 232, all respectively, mounted externally opposite each of the optical bands. A hole is provided through the lens housing for reading the optical band. A magnet 234, 236 is mounted on each of the stainless steel rings 222, 224 for sweeping past a Hall effect sensor 238, 240 when establishing a reference or starting point for reading the position of the toothed ring 218, 216, all respectively. If an absolute type optical band and encoder is used that can automatically read the location of the toothed ring 216 or 218, then the Hall effect sensor may be omitted. Appropriate electronics are provided in the printed circuit board of the encoder 230, 232 for providing a readable signal as to the location of the ring 218, 216. The optical encoder 230, 232 may be a Renishaw RGH34 or the equivalent. The position of T-Stop ring 220 is determined by an encoder on the motor/gearhead 250 that drives a spur gear 252 which in turn drives a spur gear 254 that engages the toothed T-Stop ring 220. A Hall effect sensor 256 is provided adjacent the circumferential scale portion 220a of the T-Stop ring 220 for sensing a magnet 258 and determining the reference or zero point of the ring. Thus, the positions of the toothed rings 216, 218 and 220 are sensed and a signal is produced that indicates the focal length, focus distance and T-Stop, respectively, of the lens 210 at all times. By integrating the optical type lens data sensing apparatus 214 with the lens 210, i.e. providing internal readable indicia, a higher resolution of data is possible than with the first two embodiments and the optical pattern bands are protected.

The lens data sensing apparatus 14 of the first embodiment may be constructed to be mounted adjacent to and operable with any lens by shifting the positions of the individual sensors to match the location of the rings 16, 18 and 20, whereby the apparatus 14 may be provided as part of the camera equipment and remain with the camera. In contrast, the lens data sensing apparatus 114 or 214 of the second and third embodiments is provided with and dedicated to a single lens.

In addition to the three specific embodiments of lens data sensing apparatus described above, it will readily appear to those skilled in the art that one or more of the individual data sensing devices of one embodiment may be used with the data sensing devices of the other embodiments. Further, each of the toothed rings for adjusting the focal length, focus distance and T-Stop may be provided with a motor drive and sensing devices provided with the motor for determining the location of each toothed ring, particularly when remote operation of the lens is desirable.

Figure 19:
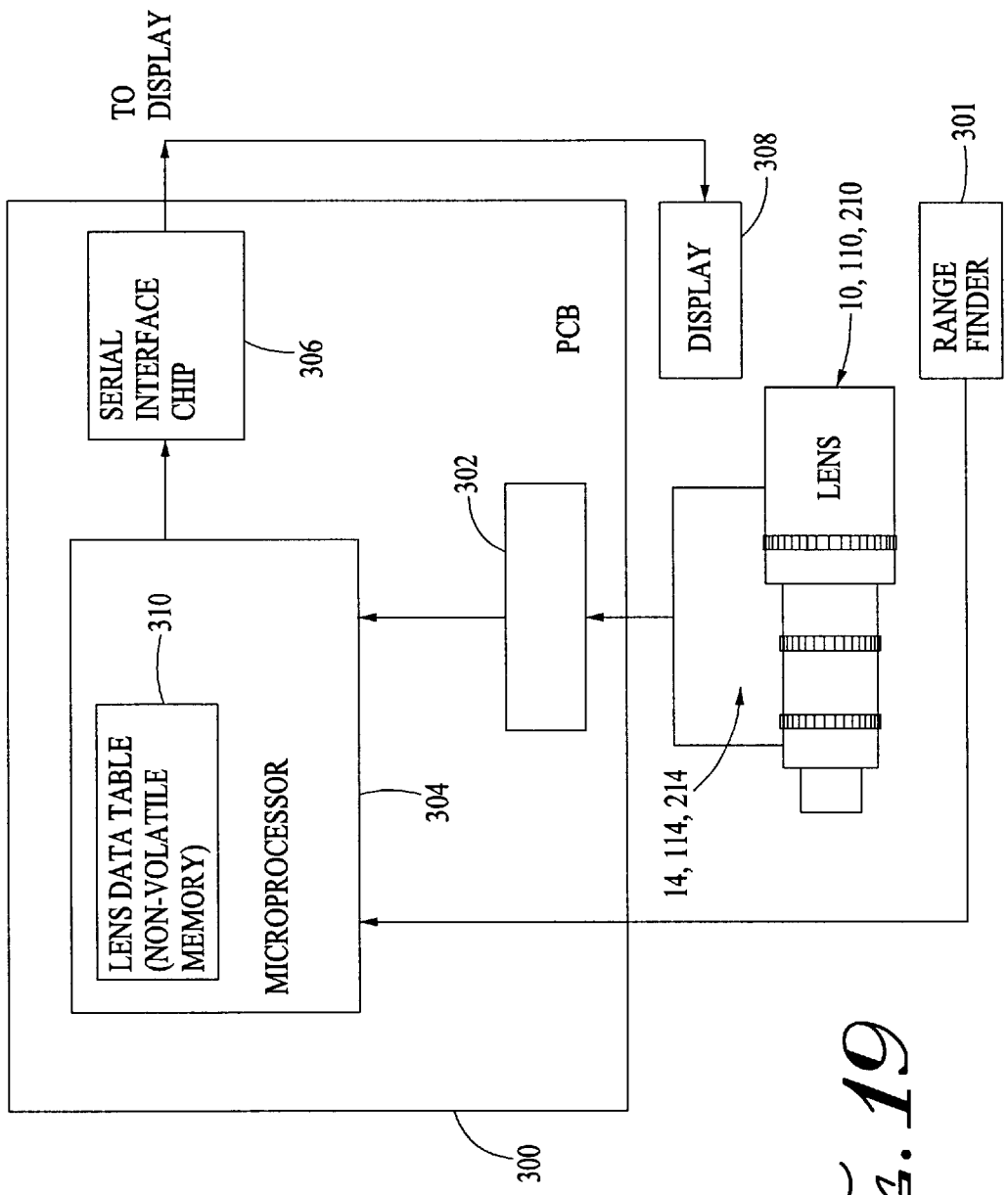
FIG. 19 is a block diagram of the data acquisition and display system of the present invention.

Referring now to FIG. 19, the system of the present invention is shown in a block diagram and, in general, comprises the lens 10, 110 or 210, the lens data sensing apparatus 14, 114 or 214, a printed circuit board (PCB) 300 with various components for that lens, and a display device. The system also is provided with a range finder 301 of any convenient type mounted adjacent the lens, usually above the lens, for determining the actual distance from the lens to the object in front of the lens being photographed. The PCB 300 includes a component 302 that receives the three signals from the lens data sensing apparatus 14, 114 or 214 representing the current settings of the focal length, focus distance and T-Stop in real time and develops a digital signal that is provided to the microprocessor 304 component of the PCB. In the case of the potentiometer type sensors used in the apparatus 14 or 114 that produce a voltage, the component 302 is an analog to digital converter. In the case of the optical encoder type sensors used in the apparatus 214 of the third embodiment, the component 302 is a digital logic chip that counts the encoder pulses to provide the digital signal and resets the count based on a signal from the Hall effect sensors. The microprocessor reads the digital position values (i.e. ring settings) of the focal length, focus distance and T-Stop channels and then transmits that data through a serial interface chip 306 to a display device 308. The digital position values are transmitted numerous times every second so that the readings on the display are always current in real time. The microprocessor also includes a lens data table 310 for that lens (or multiple lens that might be used with that microprocessor) in a non-volatile memory that relates the digital position data to the optical properties of that lens. For example, a value of 1,000 on the focus channel may represent that lens being focused at 6 feet, whereas a value of 1,000 on the focus channel for a different lens may represent being focused at 7 feet in the memory. Similarly, a value of 768 on the T-Stop channel may represent a T-Stop value of 5.6 for that lens but not for another lens. Upon power up of the system, it downloads this calibration data from the memory table 310 to the display device 308. Thereafter, as the digital position data is received continuously by the display device 308, the actual positions (settings) of the lens rings may be displayed. The lens data table 310 is created in an initial calibration procedure with the display 308 and thereafter the user, such as a cameraman, need not make any additional effort to obtain a display of the exact lens settings. When a range finder 301 is used, it is also connected to the PCB 300 and microprocessor 304 whereby the actual distance to the object in front of the lens that is being photographed also may be displayed on the display device 308 and that distance data may be used for other purposes.

Referring now to FIGS. 20–24, the display apparatus and system of the present invention that may use the lens data sensing apparatus of the three embodiments described above will now be described.

Figure 20:
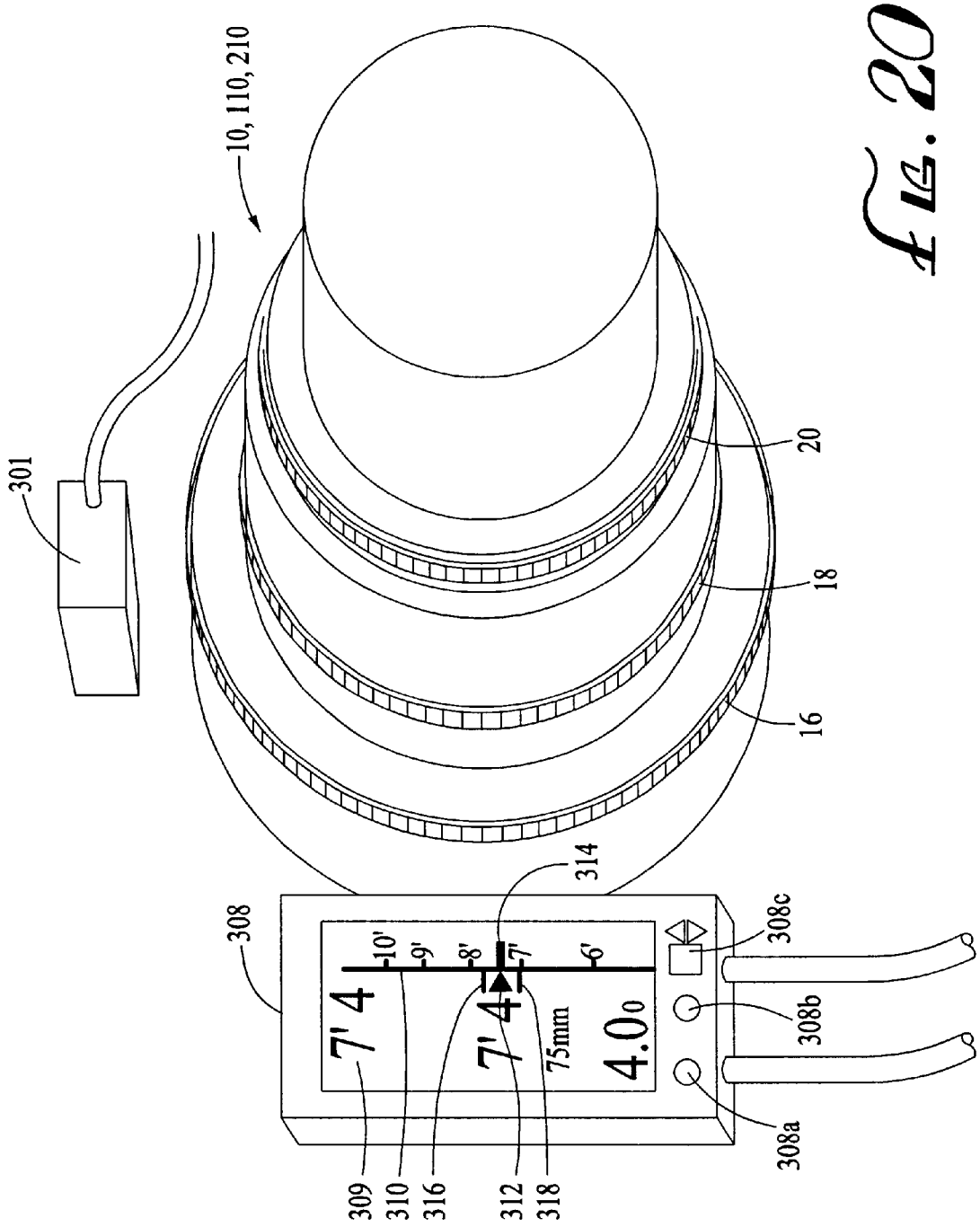

FIG. 20 represents a perspective view that a cameraman would have with the preferred arrangement of the components of the present invention and looking forward toward the scene being photographed. With the cameraman (or focus puller) positioned on the left side of the camera (omitted for clarity), the lens 10 (110 or 210) is visible and readily accessible for adjusting the focal length ring 16, focus distance ring 18 and T-Stop ring 20 in a conventional manner. The display device 308 is preferably positioned adjacent to and near the front of the lens to be visible directly or by peripheral vision by the cameraman as he looks at the scene being photographed. For example, the display device 308 may be conveniently mounted on the conventional matte box or sunscreen 11 (see FIG. 1) positioned at the front of the lens on the vertical left side, which is positioned at an angle to the lens, for convenient viewing. Since the display 308 may selectively display the lens data, distance, depth of field, etc., as described below, the cameraman continually has this information available immediately in front of him and therefore he need not look away from the scene, such as to look at the lens to change the T-Stop, focal length or focus distance, but rather he can monitor such changes on the display 308 as he makes those changes by manually rotating the respective setting rings. The type of indicia (focal length, distance, T-Stop, etc.) and their location on the screen of display 308 may be selected by the user by actuating the menu button 308a, set button 308b and the up-down button 308c.

As noted above, in addition to the focal length, focus distance and T-Stop data produced by the aforedescribed sensing apparatuses 14, 114, and 214, a distance measuring device or range finder 301 also is provided for sensing and then providing a signal for displaying the actual distance from the lens to the object being photographed. Specifically, as shown in FIG. 20, a conventional distance measuring device 301, such as one that employs an ultrasonic generator and sensor to determine the distance, senses the actual distance (7 ft. 4 inches) and displays that distance, as shown at the top of the screen of the display device 308 in FIG. 20. Any type of distance sensor may be used to provide the appropriate signal and/or data. The lens data as well as the actual distance to the object as measured by device 301 is supplied to the display device 308, and may be displayed in any convenient manner.

For example, as shown in FIG. 20, the measured distance (7'4") is displayed at the top portion 309. Further the selected focus distance setting is displayed adjacent a vertical analog scale 310 of the distances (6', 7', 8', 9' and 10') that are both less and more than the focus distance setting, which scale is displayed automatically by setting the lens focus distance using the ring 18. Here the lens focus distance has been set at exactly 7', 4" whereby the lens is at the correct focus distance shown by that distance being displayed in the middle (vertically) of the display screen to the left of the scale 310. A cursor or arrowhead 312 that is adjacent the focus distance setting value points at the point on the vertical analog scale 310 representing that focus distance setting. On the right side of the scale 310 is another cursor or bar 314 indicating the actual distance to the object, as measured by the range finder 301, which actual distance is also displayed at the top of the display, as noted above. When the bar 314 and arrowhead 312 are aligned, the lens is in focus on the sensed object. The focal length of the lens ("75 mm") is displayed immediately below the focus distance and the T-Stop ("4.0") is displayed therebelow. The PCB 300 or display device 308 also includes a microprocessor for automatically determining the depth of field based on the focal length (75 mm) of the lens, the focus distance (7'4") and the T-Stop (4.0) and displays that depth of field as the two cursors or bars 316 and 318 immediately above and below the arrowhead 302, thereby indicating the depth of field of the lens at that moment beyond (bar 316 at about 7'10") and nearer (bar 318 at about 7'1") than the actual focus distance. Further, the "circle of confusion" can be set in the display 308 to various values for appropriate depth of field calculations. By comparing the indicia on display device 308 in FIG. 20 with the indicia shown in FIG. 21, which uses a different lens focal length (35.0 mm) and T-Stop (5.6) but the same focus distance (7'4"), it may be seen that the depth of field is substantially increased with the bar 316 at nearly 10 feet and the bar 318 at less than 6 feet, even though the focus distance remains the same at 7'4".

Referring to FIG. 22, the display 308 indicates that the lens has been set to the same focal length (75 mm) and T-Stop (4.0) as in FIG. 20 but the focus distance has been changed to 14' (as shown in the middle of the display) to match a new distance of 14 feet (top of the display) measured to the object being photographed so that the lens is still focused. The depth of field, as shown by the bars 316 and 318, has changed automatically to indicate the new depth of field (about 13'3"–14'10" compared to 7'1"–7'10" in FIG. 20), although it is difficult to see on this condensed scale at 14', for this new setting of the new focus distance on the screen of display 308 from FIG. 20 to FIG. 22. Essentially, this represents a typical occurrence in filming a scene when the object being photographed, such as a person, moves from a position 7'4" from the lens to a position 14' away and the focus adjustment ring 18, 118, 218 must be rotated to maintain the focus on the object. As the focus distance ring is rotated to maintain the focus on the object, the focus distance displayed in the center of the screen progressively changes from 7'4" to 14" in real time and simultaneously the scale 310 scrolls down to continually match the current focus distance. In other words, for example, the 9' indicia on scale 310 slowly moves downwardly with the scale from the upper location (above 7'4" in FIG. 20) to the lower location (below 14' in FIG. 22) in an uninterrupted, continuous manner that is visible to the cameraman. By resetting the display 308 with buttons 308a, 308b and 308c, other scales similar to focus distance scale 310 may be displayed and will graphically scroll up or down as the values changed.

FIG. 23 represents a further change in the actual distance sensed by the range finder 301 from 7'4" in FIG. 20 and 14' in FIG. 22 to 22'3", as displayed at the top of the screen in FIG. 23, such as would occur if the object being photographed moved still further away. However, FIG. 23 represents a condition in which the cameraman has not yet refocused the lens to the actual distance of 22'3" (displayed at the top) but rather the focus setting remains at 14' (center of the screen) and the scale 310 remains the same as in FIG. 22, but the distance bar 314 has moved up the scale to the position of 22'3". To bring the lens into focus on the object at 22'3", the focus ring 18, 118, 218 is rotated and the scale 310 will scroll downwardly until the bar 314 is opposite the arrow 312 and 22'3" is displayed in the center of the screen. The depth of field bars 316 and 318 will automatically move further apart on the scale 310 to represent the increased depth of field that occurs at the increased distance (14' to 22'3") for the same settings of focal length (75 mm) and T-Stop (4.0).

Referring now to FIG. 24, the versatility of the display device 308 is further illustrated with some of the data displayed in a different manner, such as the actual distance being deleted from the top, the focal length (40.0 mm) displayed at the top, the T-Stop (2.8) immediately therebelow, and the depth of field set forth in numbers (7'2" and 5'11") at the bottom, as well as by the bars 316 and 318 on the scale. Numerous other arrangements of the data indicia may be selected by the operator using the buttons 308a, 308b and 308c. Further, when the lens is of a construction, such as an existing lens, that has insufficient space for any of the aforedescribed sensors, which space is particularly limited near the T-Stop ring in many lenses, the sensor may be omitted and the t-Stop setting of the lens may be entered by using the buttons 308a, 308b and 308c.

Thus, all of the data sensed by the three apparatuses shown in FIGS. 1–18 and described above are usefully displayed on the display device 308, as well as the actual distance to the object being photographed and the depth of field, which is calculated and displayed instantaneously, for the three adjustments of the zoom lens. Of course, if a fixed focal length lens were being used with the display device 308, the focal length would not change but the other data can be used for calculating and displaying the depth of field. It should be noted that with the display device 308 the person (focus puller) adjusting the focus of the lens during the filming of a moving object, for example an actor moving toward or away from the camera, may watch the display and continually attempt to maintain the focus distance arrowhead 312 directly opposite the actual distance bar 314 and between the depth of field bars 316 and 318, rather than continually attempting to estimate the distance to the object and the depth of field of the lens as is the common current practice.

Also, it should be noted that the display device 308 or a second display unit may be located remotely from the camera for viewing by others and/or the data may be recorded remotely.

From the foregoing description of the various embodiments and modifications, as well as the versatility of the displays that may be achieved, it will readily appear to those skilled in the art the other modifications, variations, adaptations and the like may be made and used without departing from the scope of the present inventions as defined by the following claims.

What is claimed is:

1. A system for sensing and displaying lens data for a cinematography lens and camera, comprising:
   a plurality of sensors operatively connected to the lens for producing lens signals representing current positions of focus, focal length and T-Stop settings of the lens;
   a range finder positioned adjacent the lens for producing distance signals representing the actual distance from the lens to an object located in front of the lens;
   a display device positioned adjacent the lens and having means for selectively displaying indicia; and
   a printed circuit board including a microprocessor operatively connected to said sensors, range finder and display device, said microprocessor having a memory with data representing the focus, focal length and T-Stop characteristics of that lens; and said microprocessor operating to process said lens signals and distance signals and to cause said display device to selectively graphically display indicia representing the distance to the object coordinated and in direct relationship with indicia dynamically movable with respect to each other representing at least one of said focus setting, focal length setting and T-Stop setting in real time.

2. The system of claim 1 wherein said display device includes means for displaying an analog scale of a range of distances from the lens and the indicia of both the distance to the object and the focus setting on said analog scale.

3. The system of claim 2 wherein said display device includes means for displaying separate cursors adjacent said analog scale for indicating the distance to the object and the focus setting on said analog scale, whereby the lens is in focus on the object when said cursors are aligned on said analog scale.

4. The system of claim 3 wherein the cursor for the focus setting is continually displayed near the middle of the analog scale.

5. The system of claim 2, 3 or 4 wherein said analog scale scrolls to increase or decrease the distances in the range of distances as the focus setting value is increased or decreased, respectively.

6. The system of claim 5 wherein said microprocessor includes means for producing depth of field values from the lens signals and causing the depth of field values to be displayed on said analog scale of said display device by cursors at the minimum and maximum values of the depth of field, said cursors indicating said minimum and maximum values of depth of field moving relative to said analog scale as said analog scale scrolls to increase and decrease the distances in the range.

7. The system of claim 2, 3 or 4 wherein said microprocessor includes means for producing depth of field values from the lens signals and causing the depth of field values to be displayed on said analog scale of said display device by cursors at the minimum and maximum values of the depth of field.

8. The system of claim 1 wherein said microprocessor includes means for producing depth of field values from the lens signals and causing the depth of field values to be displayed on said display device.

9. The system of claim 1 wherein at least one of said sensors comprises a gear train means for engaging a toothed ring on the lens for setting the position of one of said focus, focal length and T-Stop values, and a rotary encoder connected to said gear train means for producing the lens signal.

10. The system of claim 9 wherein said gear train means comprises a first gear directly engaging said toothed ring, a second gear mounted on a shaft of said rotary encoder, and said first gear rotatably supported on an eccentric shaft that is adjustable for adjusting the spacing between the axis of rotation of said first gear and said second gear.

11. The system of claim 9 or 10 wherein said gar train means has a portion mounted on a pivotally mounted plate, a spring engaging said plate for urging the gear train means into engagement with said toothed ring.

12. The system of claim 10 or 11 wherein said gear train means has a portion mounted on a pivotally mounted plate, a spring engaging said plate for urging the gear train means into engagement with said toothed ring.

13. The system of claim 1 wherein at least one of said sensors comprises a linear potentiometer extending circumferentially of the lens and mounted on a ring that is rotated for selecting the focus, focal length or T-stop setting of the lens, a wiper mounted on a stationary portion of the lens adjacent said ring and engaging said linear potentiometer, said linear potentiometer having means for producing the signal representing the position of the focus, focal length or T-stop setting based on the location of the engagement of the wiper on the linear potentiometer.

14. The system of claim 13 wherein said wiper comprises a roller for rolling engagement with the linear potentiometer, a finger member for rotatably supporting said roller, said finger member being mounted on the lens in a manner for causing the roller to apply a pressure for activating the linear potentiometer.

15. The system of claim 14 wherein a spring urges said finger member in a direction for said roller to apply the pressure.

16. The system of claim 13 or 14 wherein said finger member is pivotally mounted on a mounting member attached to the lens.

17. The system of claim 13 wherein said linear potentiometer comprises a pair of electrically conductive tapes partially encircling and mounted in a housing on a stationary portion of the lens, said wiper including an electrically conductive clip for engaging said pair of conductive tapes.

18. The system of claim 17 wherein said housing includes a pair of rails directed inwardly at and encircling a portion of the lens, and said wiper includes a pair of outwardly directed rails for slidably engaging said pair of housing rails, said pair of electrically conductive tapes and said electrically conductive clip mounted between each pair of rails.

19. The system of claim 1 wherein at least one of said sensors comprises an optical band extending circumferentially of the lens and mounted on a ring that is rotated for selecting the focus, focal length or T-stop setting of the lens, and an optical encoder mounted on a stationary portion of the lens adjacent said optical band for reading the position of said optical band and producing the signal representing the position of the focus, focal length or T-stop setting based on the position of said optical band.

20. The system of claim 19 wherein a magnet is mounted on said ring and a Hall effect sensor is mounted on a stationary portion of the lens adjacent said ring for sensing the presence of said magnet for thereby calibrating a starting position of said ring relative to said lens.

21. The system of claim 1 wherein said printed circuit board includes a serial interface chip for communicating data from said microprocessor to said display device.

22. The system of claim 1 or 21 wherein said printed circuit board includes a component for processing and communicating the lens signals from said sensors to said microprocessor.

23. A system for sensing and displaying lens data for a cinematography zoom lens and camera, comprising:
   a plurality of sensors operatively connected to the lens for producing lens signals representing current positions of focus, zoom and T-stop settings of the lens;
   a range finder positioned adjacent the lens for producing signals representing the distance from the lens to an object located in front of the lens;
   a display device positioned adjacent the lens and having a screen for selectively displaying indicia, said screen being visible to an operator of the lens;
   a printed circuit board including a microprocessor provided with the lens for receiving and processing said lens signals and range finder signals, said microprocessor having a memory with data representing the focus, zoom and T-stop characteristics of that lens, and said microprocessor having means for determining the current depth of field based on said lens signals;
   said range finder and display device operatively connected to said microprocessor; and
   said microprocessor operable to cause said display device to selectively graphically display indicia representing the distance to the object coordinated and in direct relationship with indicia dynamically movable with respect to each other representing at least one of said positions of the focus, zoom, T-stop settings and the depth of field in real time based on said lens signals and range finder signals.

24. The system of claim 23 wherein said display device includes means for displaying an analog scale of a range of distances from the lens and the indicia of both the distance to the object and the focus setting on said analog scale.

25. The system of claim 24 wherein said display device includes means for displaying two separate cursors adjacent said analog scale for indicating the distance to the object and the focus setting on said analog scale, whereby the lens is in focus on the object when said two cursors are aligned on said analog scale.

26. The system of claim 24 or 25 wherein said analog scale scrolls to increase or decrease the indicia of the distances in the range of distances as the focus setting value is increased or decreased, respectively.

27. The system of claim 24 or 25 wherein said microprocessor includes means for causing the depth of field values to be displayed on said analog scale of said display device by separate cursors positioned at the minimum and maximum values of the depth of field.

28. The system of claim 23 wherein at least one of said sensors comprises a gear train means for engaging a toothed ring on the lens for setting the position of one of said focus, zoom and T-Stop values, and a rotary encoder connected to said gear train means for producing the lens signal.

29. The system of claim 23 wherein each of said sensors comprises a first means extending circumferentially of the lens and mounted on a ring that is rotated for selecting the focus, focal length or T-stop setting of the lens, a second means mounted on a stationary portion of the lens adjacent said ring and being responsive to the circumferential position of said first means for producing the signal representing the position of the focus, zoom or T-stop setting.

30. The system of claim 29 wherein said first means is a linear potentiometer.

31. The system of claim 30 wherein said second means is a wiper for applying pressure to said linear potentiometer.

32. The system of claim 29 wherein said first means is an optical band and second means is an optical encoder.

33. A system for sensing and displaying lens data for a cinematography lens and camera, comprising:

a sensor operatively connected to the lens for producing a lens signal representing a current position of the focus setting of the lens;

a range finder positioned adjacent the lens for producing distance signals representing the actual distance from the lens to an object located in front of the lens;

a display device having means for selectively displaying indicia; and a printed circuit board including a microprocessor operatively connected to said sensor, range finder and display device, said microprocessor having a memory with data representing the focus, focal length and T-Stop characteristics of that lens; and said microprocessor operating to process said lens signals and distance signals and to cause said display device to simultaneously graphically display indicia representing the distance to the object dynamically movable with respect to, coordinated and in direct relationship with indicia representing said focus setting in real time.

34. The system of claim 33 further comprising means for providing to said display device the focal length of the lens and the current T-Stop setting of the lens for selectively displaying indicia representing the focal length of the lens and the T-Stop setting.

35. The system of claim 33 or 34 wherein said display device includes means for displaying an analog scale of a range of distances from the lens and the indicia of both the distance to the object and the focus setting on said analog scale.

36. The system of claim 35 wherein said display device includes means for displaying separate cursors adjacent said analog scale for indicating the distance to the object and the focus setting on said analog scale, whereby the lens is in focus on the object when said cursors are aligned on said analog scale.

37. The system of claim 35 wherein said analog scale scrolls to increase or decrease the distances in the range of distances as the focus setting value is increased or decreased, respectively.

38. The system of claim 33 wherein the lens is a zoom lens and a sensor is provided for producing a lens signal representing the current position of the focal length setting of the lens.

39. The system of claim 33 wherein said microprocessor includes means for producing depth of field values from the lens signal and memory data for causing the depth of field values to be displayed on an analog scale of said display device by cursors at the minimum and maximum values of the depth of field, said cursors indicating said minimum and maximum values of depth of field moving relative to said analog scale as said analog scale scrolls to increase and decrease the distances in the range.

40. The system of claim 33 wherein said sensor comprises a gear train means for engaging a toothed ring on the lens for setting the position of said focus value, and a rotary encoder connected to said gear train means for producing the lens signal.

41. The system of claim 40 wherein said gear train means comprises a first gear directly engaging said toothed ring, a second gear mounted on a shaft of said rotary encoder, and said first gear rotatably supported on an eccentric shaft that is adjustable for adjusting the spacing between the axis of rotation of said first gear and said second gear.

42. The system of claim 33 wherein said sensor comprises a linear potentiometer extending circumferentially of the lens and mounted on a ring that is rotated for selecting the focus setting of the lens, a wiper mounted on a stationary portion of the lens adjacent said ring and engaging said linear potentiometer, said linear potentiometer having means for producing the signal representing the position of the focus setting based on the location of the engagement of the wiper on the linear potentiometer.

43. The system of claim 42 wherein said wiper comprises a roller for rolling engagement with the linear potentiometer, a finger member for rotatably supporting said roller, said finger member being mounted on the lens in a manner for causing the roller to apply a pressure for activating the linear potentiometer.

44. The system of claim 43 wherein a spring urges said finger member in a direction for said roller to apply the pressure.

45. The system of claim 42 or 43 wherein said finger member is pivotally mounted on a mounting member attached to the lens.

46. The system of claim 42 wherein said linear potentiometer comprises a pair of electrically conductive tapes partially encircling and mounted in a housing on a stationary portion of the lens, said wiper including an electrically conductive clip for engaging said pair of conductive tapes.

47. The system of claim 33 wherein said sensor comprises an optical band extending circumferentially of the lens and mounted on a ring that is rotated for selecting the focus setting of the lens, and an optical encoder mounted on a stationary portion of the lens adjacent said optical band for reading the position of said optical band and producing the signal representing the position of the focus setting based on the position of said optical band.

48. The system of claim 47 wherein a magnet is mounted on said ring and a Hall effect sensor is mounted on a stationary portion of the lens adjacent said ring for sensing the presence of said magnet for thereby calibrating a starting position of said ring relative to said lens.

* * * * *